United States Patent [19]
Barton

[11] 3,720,305
[45] March 13, 1973

[54] VEHICLE WINDSHIELD LIQUID CONCENTRATE PACKAGE

[76] Inventor: Frederic D. Barton, 47736 Ahumanu Loop, Kaneohe, Hawaii 96734

[22] Filed: June 9, 1971

[21] Appl. No.: 151,355

[52] U.S. Cl................206/47 R, 206/56 AB, 229/56
[51] Int. Cl. ....B65d 77/08, B65d 75/42, B65d 31/12
[58] Field of Search .206/47 R, 65 T, 56 AB; 229/56; 252/90

[56] References Cited

UNITED STATES PATENTS

| | | | |
|---|---|---|---|
| 3,008,835 | 11/1961 | Madding | 206/47 A X |
| 3,469,768 | 9/1969 | Repko | 229/56 |
| 3,528,925 | 9/1970 | Chapuis | 252/90 X |

FOREIGN PATENTS OR APPLICATIONS 525,042  4/1955  Italy.................206/56 AB Primary Examiner—Leonard Summer
Attorney—William L. Fisher

[57] ABSTRACT

A vehicle windshield liquid concentrate package is disclosed comprising double containers of flexible sheet material separately containing, respectively, an anti-freeze concentrate in liquid form and an aqueous windshield washer concentrate in liquid form, and means joining said containers together during storage and shipment which can be torn apart at the time of use to separate the two containers to facilitate opening them so that the point of use the two concentrates may be freshly admixed and added to the vehicle windshield cleaner container, said containers two isosceles triangular sided tetrahedrons joined along one pair of corresponding unequal length sides.

1 Claim, 3 Drawing Figures

PATENTED MAR 13 1973 3,720,305
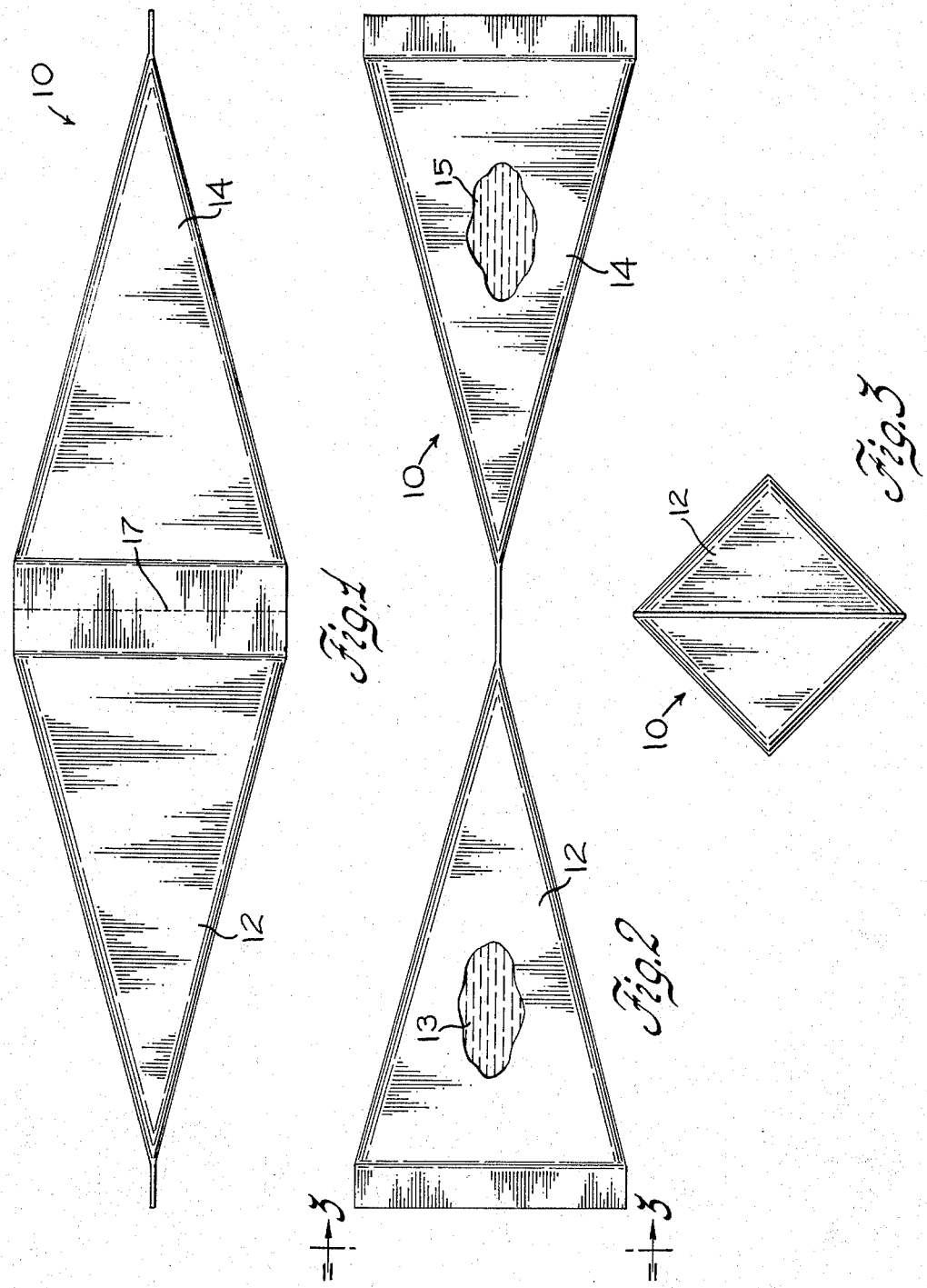
INVENTOR.
Frederic D. Barton
BY William L. Fisher Esq.
HIS ATTORNEY

VEHICLE WINDSHIELD LIQUID CONCENTRATE PACKAGE

My invention relates to the packaging of vehicle windshield liquid concentrates used in cleaning vehicle windshields.

The principal object of my invention is the provision of a vehicle windshield liquid concentrate package which can separately contain predetermined quantities of two vehicle windshield liquid concentrates in liquid form that cannot be prolongedly admixed without deleterious effect upon each other and which package maintains the two concentrates physically together during storage and shipment without admixture so that at the point of use they may be freshly admixed and added to the vehicle windshield cleaner container.

The foregoing object of my invention and the advantages thereof will become apparent during the course of the following description, taken in conjunction with the accompanying drawings, in which:

FIGS. 1, 2 and 3 are, respectively, front elevational, top plan and end elevational views of a vehicle windshield liquid concentrate embodying my invention.

Referring to the drawings in greater detail, 10 designates said vehicle windshield liquid concentrate package which comprises double liquid-tight sealed containers 12 and 14 separately containing, respectively, conventional anti-freeze concentrate 13 in liquid form, such as ethylene glycol, and conventional windshield washer concentrate 15 in liquid form, such as an aqueous solution of water soluble detergents and wetting agents. A particularly satisfactory windshield washer solution consisting of an aqueous solution of detergents and wetting agents is a product presently marketed under the trademark "Bar's Bugs". Said vehicle windshield liquid concentrate package also comprises means 16 joining said containers 12 and 14 together during storage and shipment, which means 16 is constructed to be torn apart at the time of use, as by a perforated junction line 17, to enable the two containers to be individually opened. Said containers 12 and 14 are formed of flexible metal coated sheet material, such as aluminum coated cardboard, for containing their respective liquid contents and shaped into isosceles triangular sided tetrahedrons joined along one pair of corresponding unequal length sides.

The package 10 rests on a flat surface without rolling, such as the floor of a vehicle's glove compartment, upon either the top or bottom surfaces of said package 10 when said package 10 is disposed so that the means 16 is disposed parallel to and in contact with said flat surface.

At the point of use in the winter the package 10 is torn apart at the perforated junction line 17. The containers 12 and 14 are each opened and the contents thereof added to the vehicle windshield cleaner container carried on the vehicle beneath the hood thereof. Since such contents are concentrates, water is added to form a vehicle windshield cleaner solution of suitable dilution.

It will thus be seen that there has been provided by my invention, a vehicle windshield liquid concentrate package in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims.

What I claim is:

1. A vehicle windshield liquid concentrate package comprising double containers of flexible sheet material separately containing, respectively, an anti-freeze concentrate in liquid form and an aqueous windshield washer concentrate in liquid form, and means joining said containers together during storage and shipment which can be torn apart at the time of use to separate the two containers to facilitate opening them so that at the point of use the two concentrates may be freshly admixed and added to the vehicle windshield cleaner container, said containers being two isosceles triangular sided tetrahedrons joined along one pair of corresponding unequal length sides.

* * * * *